Patented Apr. 10, 1934

1,954,707

UNITED STATES PATENT OFFICE 1,954,707

PREPARATION OF 1-THIOGLYCOL 2-AMINO 5-ALKOXY BENZENE DERIVATIVES

Herbert August Lubs and John Elton Cole, Wilmington, Del., assignors to E. I. du Pont de Nemours & Company, Wilmington, Del., a corporation of Delaware No Drawing. Application August 10, 1932, Serial No. 628,179

20 Claims. (Cl. 260—108)

This invention relates to 1-thioglycol 2-amino 5-alkoxy benzene derivatives and more particularly to the preparation thereof.

These compounds, that is, 1-thioglycol 2-amino 5-alkoxy benzene derivatives are well known as valuable dyestuff intermediates, being commonly employed in the manufacture of thioindigo dyes. However, the methods employed up to the present time for preparing this type of intermediate are expensive and difficult to control commercially. For this reason the price of these materials and the dyestuffs produced therefrom have been almost prohibitive, thereby greatly limiting their use.

An object of the present invention is to provide simpler and more economical processes for preparing the 1-thioglycol 2-amino 5-alkoxy benzene compounds than have heretofore been employed. A further object is to provide a process whereby a purer product may be obtained with less operating hazards. Other objects will appear hereinafter.

These objects may be accomplished according to our invention whereby a 5-alkoxy-mercapto-benzothiazole is produced by treating a para-alkoxy-aniline with carbon bisulfide and sulfur at elevated temperatures and pressures. Thereafter, the alkoxy-mercapto-benzothiazole is hydrolyzed by means of caustic alkali and water under such conditions that the alkoxy group will not be affected or destroyed and a 2-amino 5-alkoxy thiophenol produced. Finally, the amino alkoxy thiophenol is treated with an alkali salt of chloracetic acid to produce the 1-thioglycol 2-amino 5-alkoxy benzene.

The reactions taking place are probably represented by the following equations wherein R in the various formulas represents an alkyl group:

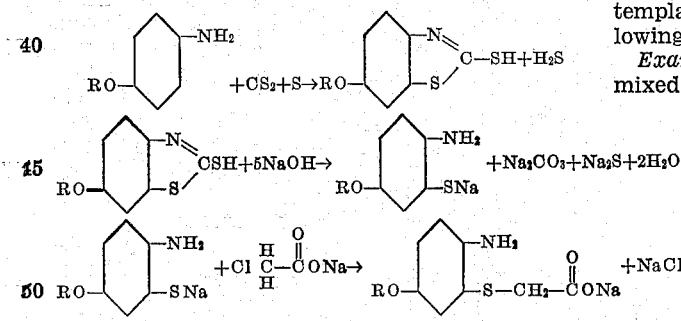

In Berichte, vol. 20, page 1790, it is disclosed that mercapto-benzothiazole may be fused with alkali to form ortho-amino thiophenol. When it is attempted to hydrolyze a 5-alkoxy-mercapto-benzothiazole by the process given in Berichte, the alkoxy group is destroyed and the resulting product is 2-amino 5-oxy thiophenol.

We have found that, by properly controlling the temperatures employed and the concentration and condition of the alkali, a 5-alkoxy-mercapto-benzothiazole may be hydrolyzed with the production of a 2-amino 5-alkoxy thiophenol. Our invention is based upon the discovery that, when the hydrolysis of the 5-alkoxy-mercapto-benzothiazole is caused to take place at temperatures within the range of 165–210° C., in the presence of caustic alkali and water sufficient in amount to cause the alkali and thiazole mixture to be fluid at the temperature employed, substantially no destruction of the alkoxy-group takes place and a high yield of the 2-amino 5-alkoxy thiophenol is produced.

The conditions of temperature and caustic concentration are very important in the hydrolysis step. When temperatures below 165° C. are employed, practically no hydrolysis takes place and, when temperatures above 210° C. are employed, the product is always badly contaminated with 2-amino 5-oxy thiophenol. While any temperatures within this range may be employed, we have found that temperatures between 180–200° C. will usually give the preferable results.

For the most economic operation with the production of the highest yields of the purest product, the highest possible initial concentration of caustic should be employed which will give a molten fusion mass at the optimum temperature. This concentration of the caustic is usually about 80% NaOH exclusive of the thiazole present. However, lower concentrations can be employed down to as low as 50% NaOH but, in general, at a given temperature the yield is inversely proportional to the caustic concentration and thus the lower concentrations will not usually be found to be advantageous.

In order to more clearly illustrate our invention and the preferred mode in which we contemplate carrying the same into effect, the following examples are given:

*Example 1.*—Para phenetidine (1 part) was mixed with sulfur (.24 parts) and carbon disulfide (.70 parts). This mixture was heated in an autoclave at 200° C. and 750 pounds pressure for 3 hours. After removing the H₂S, the product was cast in blocks. This crude product was heated with 1.5 parts of caustic soda and just enough water to make the mass molten at 180° C. This mixture was heated 8 hours at 180–185° C. Then, the mass was diluted with water and the excess caustic removed by the careful addition of hydrochloric acid. A solution of sodium chlor acetate was added at a temperature of 10° C. whereupon the temperature rose to about 30° C. at which temperature it was held for 1 hour. The product, the sodium salt of 1-thioglycol 2-amino 5-ethoxy benzene, can be isolated or used in any of a number of ways well known in the art.

*Example 2.*—In a similar manner by starting with paraanisidine, 1-thioglycol 2-amino 5-methoxy benzene can be prepared.

The temperatures at which the chlor acetate is added to the solution of the amino thiophenol may be widely varied. Usually, temperatures between 0 and 50° C. will be found to be most desirable.

From the above examples it will be apparent that by varying the starting materials a whole series of alkoxy compounds, for example the isopropyl, butyl, hexyl and the like, may be obtained.

While we have disclosed a method for preparing certain compounds employing specific conditions and materials in specific proportions, it will be apparent to those skilled in the art that many variations and modifications in the materials, conditions, and proportions of materials employed may be made without departing from the spirit of our invention. Accordingly, the scope of our invention is to be limited solely by the appended claims construed as broadly as is permissible in view of the prior art.

We claim:

1. In a process, the step which comprises hydrolyzing a 5-alkoxy-mercapto-benzothiazole in the presence of caustic alkali and water, the water being present in such amount that the alkali-water combination will melt at a temperature of 210° C. or less.

2. In a process, the step which comprises hydrolyzing a 5-alkoxy-mercapto-benzothiazole in the presence of caustic alkali and water, the alkali being present in an amount at least equal to that of the water and the water being present in such amount that the alkali-water combination will melt at a temperature of 210° C. or less.

3. In a process, the step which comprises heat-into a temperature of about 165–210° C. a caustic alkali and a 5-alkoxy-mercapto-benzothiazole in the presence of water less in amount than the alkali but sufficient to render the alkali and thiazole fluid at the temperature employed.

4. In a process, the step which comprises heating to a temperature of about 165–210° C. a mixture of a 5-alkoxy-mercapto-benzothiazole and caustic alkali containing about 50–20% of water.

5. In a process, the step of heating to about 180–200° C. a mixture of a 5-alkoxy-mercapto-benzothiazole and caustic alkali containing about 20% of water.

6. In a process, the step which comprises hydrolyzing a 5-ethoxy-mercapto-benzothiazole in the presence of caustic alkali and water, the water being present in such amount that the alkali-water combination will melt at a temperature of 210° C. or less.

7. In a process, the step which comprises hydrolyzing a 5-ethoxy-mercapto-benzothiazole in the presence of caustic alkali and water, the alkali being present in an amount at least equal to that of the water and the water being present in such amount that the alkali-water combination will melt at a temperature of 210° C. or less.

8. In a process, the step which comprises heating to a temperature of about 165–210° C. a caustic alkali and a 5-ethoxy-mercapto-benzothiazole in the presence of water less in amount than the alkali but sufficient to render the alkali and thiazole fluid at the temperature employed.

9. In a process, the step which comprises heating to a temperature of about 165–210° C. a mixture of a 5-ethoxy-mercapto-benzothiazole and caustic alkali containing about 50–20% of water.

10. In a process, the step which comprises hydrolyzing 5-methoxy-mercapto-benzothiazole in the presence of caustic alkali and water, the water being present in such amount that the alkali-water combination will melt at a temperature of 210° C. or less.

11. In a process, the step which comprises hydrolyzing a 5-methoxy-mercapto-benzothiazole in the presence of caustic alkali and water, the alkali being present in an amount at least equal to that of the water and the water being present in such amount that the alkali-water combination will melt at a temperature of 210° C. or less.

12. In a process, the step which comprises heating to a temperature of about 165–210° C. a caustic alkali and a 5-methoxy-mercapto-benzothiazole in the presence of water less in amount than the alkali but sufficient to render the alkali and thiazole fluid at the temperature employed.

13. In a process, the step which comprises heating to a temperature of about 165–210° C. a mixture of a 5-methoxy-mercapto-benzothiazole and caustic alkali containing about 50–20% of water.

14. A process for preparing a 1-thioglycol 2-amino 5-alkoxy benzene which comprises, heating a para-alkoxy-aniline with carbon bisulfide and sulfur at elevated temperatures and pressures until reaction is complete, heating the reaction product at about 165–210° C. with caustic alkali containing about 50–20% of water until hydrolysis is complete, neutralizing the excess caustic with acid and then treating the resulting product with sodium chlor acetate at about 0–50° C. until reaction is complete.

15. A process for preparing a 1-thioglycol 2-amino 5-alkoxy benzene which comprises, heating a para-alkoxy-aniline with carbon bisulfide and sulfur at elevated temperatures and pressures until reaction is complete, heating the reaction product at about 180–200° C. with caustic alkali comprising about 80% caustic and 20% water until hydrolysis is complete, neutralizing the excess caustic with acid and then treating the resulting product with sodium chlor acetate at about 0–50° C. until reaction is complete.

16. A process for preparing a 1-thioglycol 2-amino 5-alkoxy benzene which comprises, heating para-phenetidine with carbon bisulfide and sulfur at elevated temperatures and pressures until reaction is complete, heating the reaction product at about 165–210° C. with caustic alkali containing about 50–20% of water until hydrolysis is complete, neutralizing the excess caustic with acid and then treating the resulting product with sodium chlor acetate at about 0–50° C. until reaction is complete.

17. A process for preparing 1-thioglycol 2-amino 5-alkoxy benzene which comprises, heating para-phenetidine with carbon bisulfide and sulfur at elevated temperatures and pressures until reaction is complete, heating the reaction product at about 180–200° C. with caustic alkali comprising about 80% caustic and 20% water until hydrolysis is complete, neutralizing the excess caustic with acid and then treating the resulting product with sodium chlor acetate at about 0–50° until reaction is complete.

18. A process for preparing a 1-thioglycol 2-amino 5-alkoxy benzene which comprises, heating para-anisidine with carbon bisulfide and sulfur at elevated temperatures and pressures until reaction is complete, heating the reaction product at about 165-210° C. with caustic alkali containing about 50-20% of water until hydrolysis is complete, neutralizing the excess caustic with acid and then treating the resulting product with sodium chlor acetate at about 0-50° C. until reaction is complete.

19. A process for preparing a 1-thioglycol 2-amino 5-alkoxy benzene which comprises, heating para-anisidine with carbon bisulfide and sulfur at elevated temperatures and pressures until reaction is complete, heating the reaction product at about 180-200° C. with caustic alkali comprising about 80% caustic and 20% water until hydrolysis is complete, neutralizing the excess caustic with acid and then treating the resulting product with sodium chlor acetate at about 0-50° C. until reaction is complete.

20. The process for preparing a 1-thioglycol 2-amino 5-alkoxy benzene which comprises treating a para-alkoxy aniline to convert it to a 5-alkoxy-mercapto-benzothiazole, hydrolyzing the 5-alkoxy-mercapto-benzothiazole by means of caustic alkali to produce a 2-amino 5-alkoxy thiophenol, and then treating the 2-amino 5-alkoxy thiophenol with a chlor acetate to produce the 1-thioglycol 2-amino 5-alkoxy benzene.

HERBERT AUGUST LUBS.
JOHN ELTON COLE.